United States Patent
Seo

(10) Patent No.: US 8,532,625 B2
(45) Date of Patent: Sep. 10, 2013

(54) APPARATUS AND METHOD FOR PREVENTING MULTIMEDIA MESSAGE RETRIEVAL IN MOBILE COMMUNICATION SYSTEM

(75) Inventor: Ho-Sub Seo, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1533 days.

(21) Appl. No.: 11/778,977

(22) Filed: Jul. 17, 2007

(65) Prior Publication Data

US 2008/0020743 A1 Jan. 24, 2008

(30) Foreign Application Priority Data

Jul. 20, 2006 (KR) .............................. 2006-0067733

(51) Int. Cl.
*H04M 1/725* (2006.01)
(52) U.S. Cl.
USPC ........ 455/412.2; 455/466; 709/206; 709/207; 709/219
(58) Field of Classification Search
USPC ................ 455/412.1–414.4, 403, 422.1, 466
See application file for complete search history.

(56) References Cited

U.S. PATENT DOCUMENTS

| | | | |
|---|---|---|---|
| 7,366,528 B1 * | 4/2008 | Mikan | 455/412.2 |
| 7,519,670 B2 * | 4/2009 | Hagale et al. | 709/206 |
| 2004/0048627 A1 * | 3/2004 | Olvera-Hernandez | 455/466 |
| 2004/0148400 A1 * | 7/2004 | Mostafa | 709/227 |
| 2006/0019639 A1 * | 1/2006 | Adams et al. | 455/412.2 |
| 2006/0099932 A1 * | 5/2006 | Smith et al. | 455/412.1 |
| 2006/0166649 A1 * | 7/2006 | Roach | 455/411 |
| 2007/0038702 A1 * | 2/2007 | Taylor et al. | 709/206 |
| 2007/0077922 A1 * | 4/2007 | Kim et al. | 455/414.2 |
| 2007/0191035 A1 * | 8/2007 | Huggett | 455/466 |

FOREIGN PATENT DOCUMENTS

| | | |
|---|---|---|
| KR | 1020060076722 | 7/2006 |
| KR | 1020060081172 | 7/2006 |

* cited by examiner

*Primary Examiner* — Vladimir Magloire
(74) *Attorney, Agent, or Firm* — The Farrell Law Firm, P.C.

(57) ABSTRACT

Provided is an apparatus and method for preventing multimedia message retrieval in a mobile communication system. It is determined if a message indicating an elapse of an expiration time of a multimedia message is received from an multimedia message service center (MMSC), and disables a retrieval process for a multimedia message the expiration time of which has elapsed, when the message indicating the elapse of the expiration time is received.

16 Claims, 5 Drawing Sheets

APPARATUS AND METHOD FOR PREVENTING MULTIMEDIA MESSAGE RETRIEVAL IN MOBILE COMMUNICATION SYSTEM

PRIORITY

This application claims priority under 35 U.S.C. §119 to an application filed in the Korean Intellectual Property Office on Jul. 20, 2006 and allocated Serial No. 2006-67733, the contents of which are hereby incorporated by reference.

BACKGROUND OF THE INVENTION

1. Field of the Invention

The present invention relates generally to an apparatus and method for preventing multimedia message retrieval in a mobile communication system, and more particularly, to an apparatus and method for preventing a mobile communication terminal from retrieving a multimedia message after an expiration time.

2. Description of the Related Art

A multimedia message service (hereinafter, referred to as an MMS) refers to a message service for not only text messages but also high-quality multimedia messages.

In general, when a transmission terminal is set to transmit a message using the MMS, an expiration time of the message is determined, and then the message is transmitted to a multimedia message service center (hereinafter, referred to as an MMSC). Thereafter, the MMSC transmits an MMS notification message to a reception terminal before sending the multimedia message to the reception terminal, thereby notifying the reception terminal of the arrival of the multimedia message. Then, if the expiration time elapses, the MMSC discards the multimedia message. Thus, a user of the reception terminal may needlessly perform an MMS retrieval process to receive the multimedia message, without noticing that the multimedia message has been discarded.

As described above, in the conventional mobile communication system, the reception terminal is not notified of the fact that the multimedia message has been discarded after the expiration time, and thus may make an unnecessary call for retrieving the discarded multimedia message. Hence, the unnecessary call may disadvantageously create an additional cost.

SUMMARY OF THE INVENTION

An object of the present invention is to substantially solve at least the above problems and/or disadvantages and to provide at least the advantages below. Accordingly, an object of the present invention is to provide an apparatus and method for preventing multimedia message retrieval in a mobile communication system.

Another object of the present invention is to provide an apparatus and method for notifying a mobile terminal that an expiration time of a multimedia message has elapsed.

Another object of the present invention is to provide an apparatus and method for preventing retrieval of multimedia message after an expiration time.

According to one aspect of the present invention, a method for preventing multimedia message retrieval in a mobile communication terminal includes determining if a message indicating an elapse of an expiration time of a multimedia message is received from an MMSC (Multimedia Message Service Center); and disabling a retrieval process for a multimedia message the expiration time of which has elapsed, when the message indicating the elapse of the expiration time is received.

According to another aspect of the present invention, a method for preventing multimedia message retrieval in an MMSC (Multimedia Message Service Center), includes determining if an expiration time of a received multimedia message has elapsed when the multimedia message is received from a transmission terminal; and sending to a reception terminal of the multimedia message a message indicating the lapse of the expiration when it is determined that the expiration time of the received multimedia message has elapsed.

According to another aspect of the present invention, an apparatus for preventing multimedia message retrieval in a mobile communication terminal includes a controller performing control so that when a message indicating an elapse of an expiration time of a multimedia message is received, a retrieval process for the multimedia message the expiration time of which has elapsed is disabled.

According to another aspect of the present invention, an apparatus for preventing multimedia message retrieval in an MMSC (Multimedia Message Service Center) includes a storage unit storing a multimedia message received from a transmission terminal; an expiration time determination unit for determining if an expiration time of the multimedia message stored in the storage unit has elapsed; and a controller for sending to a reception terminal of the multimedia message a message indicating the elapse of the expiration time.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
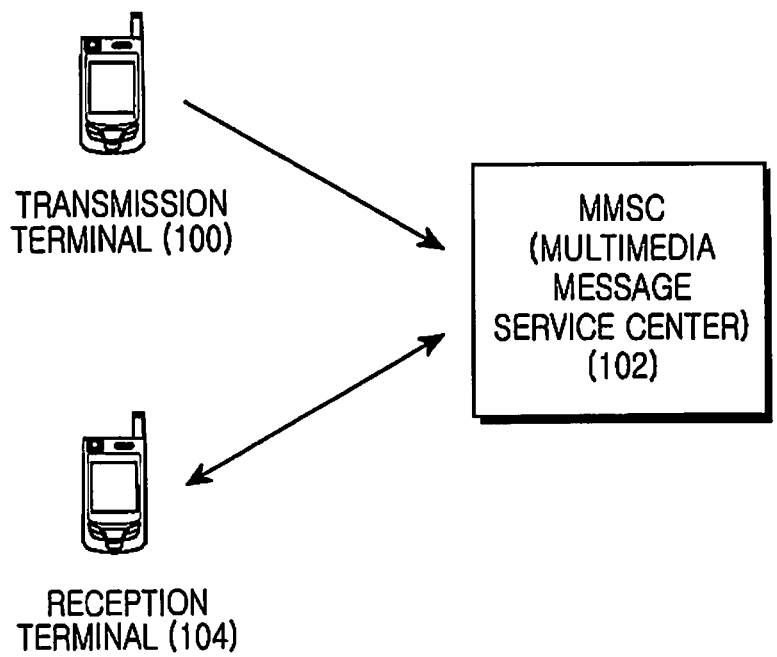
FIG. 1 illustrates a configuration of a mobile communication system according to the present invention.

FIG. 1 illustrates a configuration of a mobile communication system according to the present invention. The mobile communication system includes a transmission terminal 100, a multimedia message service center (hereinafter, referred to as an MMSC) 102, and a reception terminal 104.

Referring to FIG. 1, the transmission terminal 100 sets an expiration time of a multimedia message that is set to be transmitted to the reception terminal 104, and then sends the multimedia message to the MMSC 102.

When receiving the multimedia message, the MMSC 102 checks the expiration time of the multimedia message and the status of the reception terminal 104, and sends a multimedia message service (MMS) notification message notifying the reception terminal 104 of the arrival of the multimedia message. Thereafter, if the expiration time elapses in a state where the received multimedia message is not completely retrieved from the reception terminal 104, the MMSC 102 notifies the reception terminal 104 that the expiration time of the multimedia message has elapsed, and discards the multimedia message.

When receiving the MMS notification message from the MMSC 102, the reception terminal 104 notifies a user of the reception of the multimedia message. Thereafter, when receiving a message indicating that the expiration time of the received multimedia message has elapsed, the reception terminal 104 notifies a user that the corresponding multimedia message has been discarded due to the lapse of the expiration time.

Figure 2:
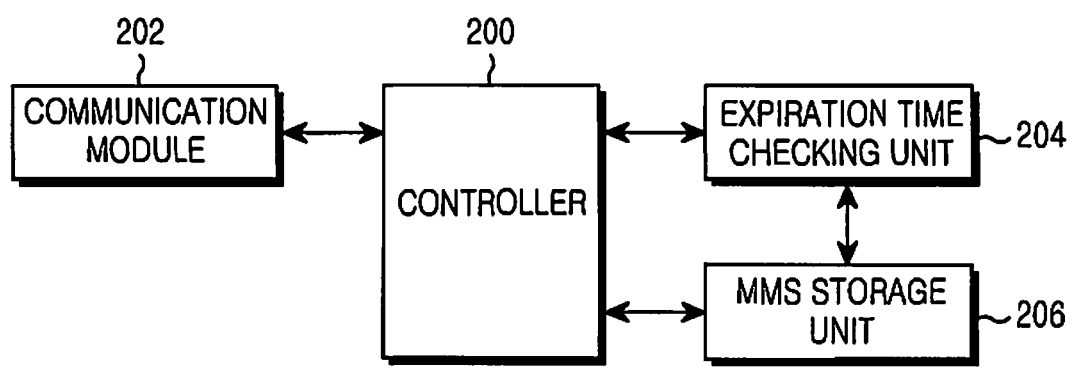
FIG. 2 is a block diagram of a multimedia message service center (MMSC) according to the present invention.

FIG. 2 is a block diagram of an MMSC according to the present invention. The MMSC includes a controller 200, a communication module 202, an expiration time checking unit 204, and an MMS storage unit 206.

Referring to FIG. 2, the controller 200 performs processing and controlling for the reception/transmission of a multimedia message. The controller 200 controls functions for transmitting a multimedia message to a reception terminal when receiving the multimedia message from a transmission terminal. Particularly, according to the present invention, when receiving from the expiration time checking unit 204 a signal indicating that an expiration time of a specific multimedia message has elapsed, the controller 200 transmits to a reception terminal of the specific multimedia message a signal indicating that the expiration time of the corresponding multimedia message has elapsed, and controls a function for discarding the corresponding multimedia message.

The communication module 202 performs a function for processing the transmission/reception of a radio signal of data input/output through an antenna. For example, in the case of transmission, the communication module 202 serves to convert a baseband signal obtained by channel-coding and spreading data to be transmitted into a Radio Frequency (RF) signal, and transmits the RF signal through the antenna. In the case of reception, the communication module 202 serves to convert a received RF signal into a baseband signal, and de-spreads and channel-decodes the baseband signal to restore data. Particularly, according to the present invention, the communication module 202 serves to transmit to the reception terminal an expiration time elapse notifying message input from the controller 200.

The expiration time checking unit 204 determines an expiration time of a multimedia message stored in the MMS storage unit 206. When the lapse of the expiration time of a specific multimedia message is determined, the expiration time checking unit 204 outputs to the controller 200 a signal indicating that the expiration time of the specific multimedia message has lapsed.

The MMS storage unit 206 stores the multimedia message received from the transmission terminal.

Figure 3:
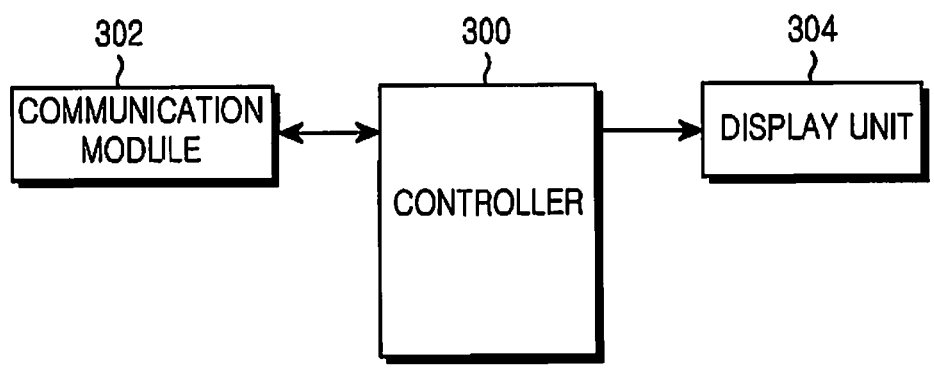
FIG. 3 is a block diagram of a mobile communication terminal according to the present invention.

FIG. 3 is a block diagram of a mobile communication terminal according to the present invention. The mobile communication terminal includes a controller 300, a communication module 302, and a display unit 304.

Referring to FIG. 3, the controller 300 controls and processes an overall operation of the mobile communication terminal, that is, functions for voice communications and data communications. Particularly, when receiving a signal transmitted from an MMSC and indicating that an expiration time of a multimedia message has lapsed, the controller 300 disables a retrieval process for the multimedia message the expiration time of which has elapsed, and controls a function for displaying on the display unit 304 a message indicating that the corresponding multimedia message has been discarded due to the lapse of the expiration time.

The communication module 302 serves to process the reception/transmission of a radio signal of data input/output through an antenna. For example, in the case of transmission, the communication module 302 converts a baseband signal obtained by channel-coding and spreading data to be transmitted into an RF signal, and transmits the RF signal through an antenna. In the case of reception, the communication module 302 converts a received RF signal into a baseband signal, and de-spreads and channel-decodes the baseband signal to restore data.

The display unit 304 displays state information and a limited number of characters generated during an operation of the mobile communication terminal. The display unit 304 displays a message indicating that a multimedia message has been discarded and thus is unavailable for reception due to the lapse of the expiration time of the multimedia message.

Figure 4:
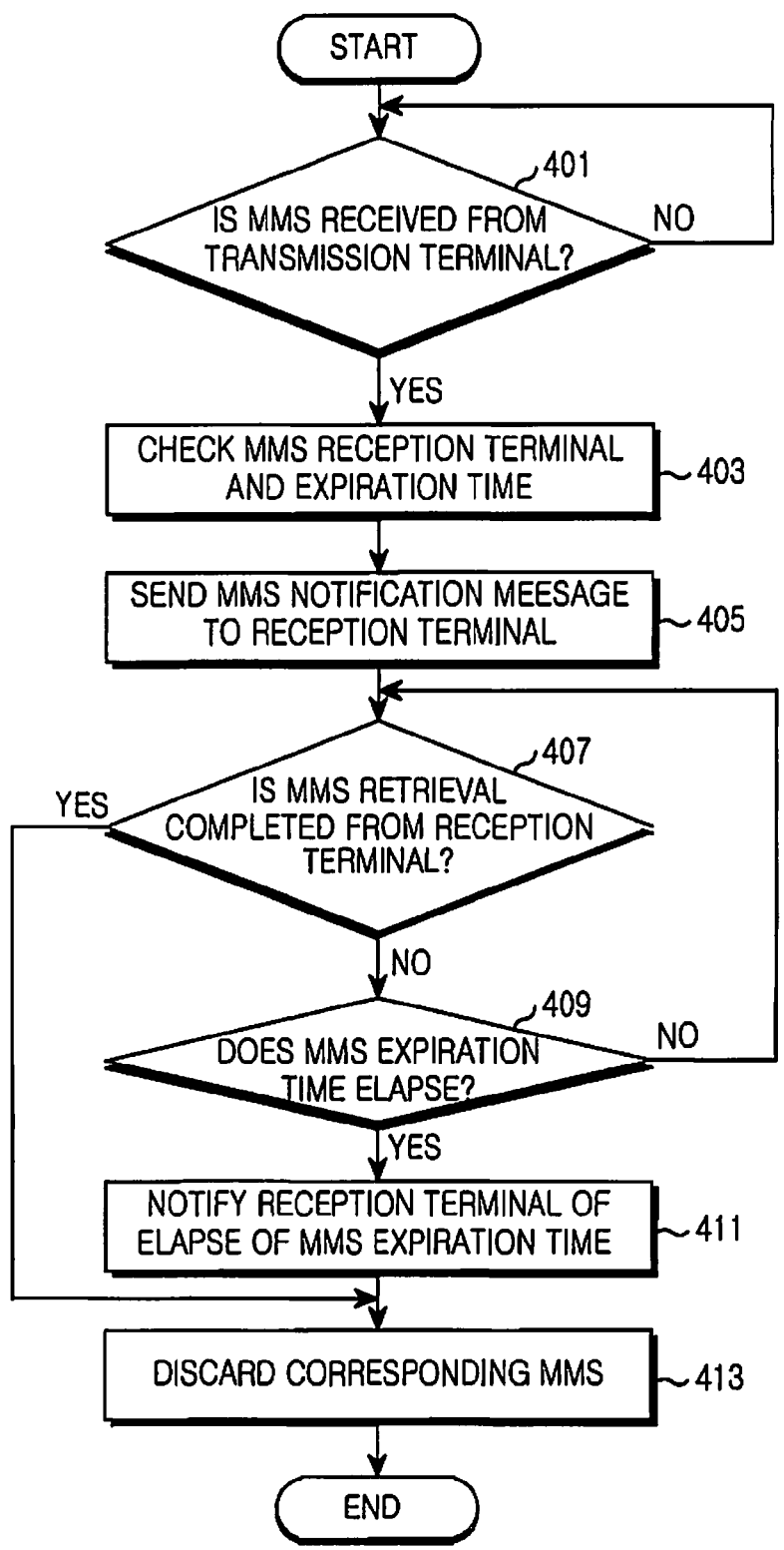
FIG. 4 is a flowchart illustrating a process of notifying a mobile communication terminal that an expiration time of a multimedia message has elapsed, in an MMSC according to the present invention.

FIG. 4 is a flowchart of a process for preventing multimedia message retrieval of a mobile communication terminal in an MMSC according to the present invention.

Referring to FIG. 4, in step 401, the MMSC determines if a multimedia message is received from a transmission terminal. In step 403, when the multimedia message is received, the MMSC determines an expiration time of the multimedia message, and the status of a reception terminal. In step 405, the MMSC sends the reception terminal an MMS notification message indicating that the multimedia message has been received.

In step 407, the MMSC determines if the multimedia message is transmitted to the reception terminal as MMS retrieval for the multimedia message is performed from the reception terminal. In step 409, when the MMS retrieval for the multimedia message is not performed from the reception terminal, the MMSC determines if the expiration time of the multimedia message has elapsed.

When it is determined that the expiration time has not elapsed, the MMSC returns to step 407. In step 411, when it is determined that the expiration time has elapsed, the MMSC sends to the reception terminal a message indicating the elapse of the expiration time of the multimedia message has elapsed. In step 413, the MMSC discards the multimedia message the expiration time has elapsed, and terminates an algorithm according to the present invention.

In contrast, when the multimedia message has been sent to the reception terminal as the MMS retrieval is performed from the reception terminal in step 407, the MMSC discards the multimedia message in step 413 and terminates an algorithm according to the present invention.

Figure 5:
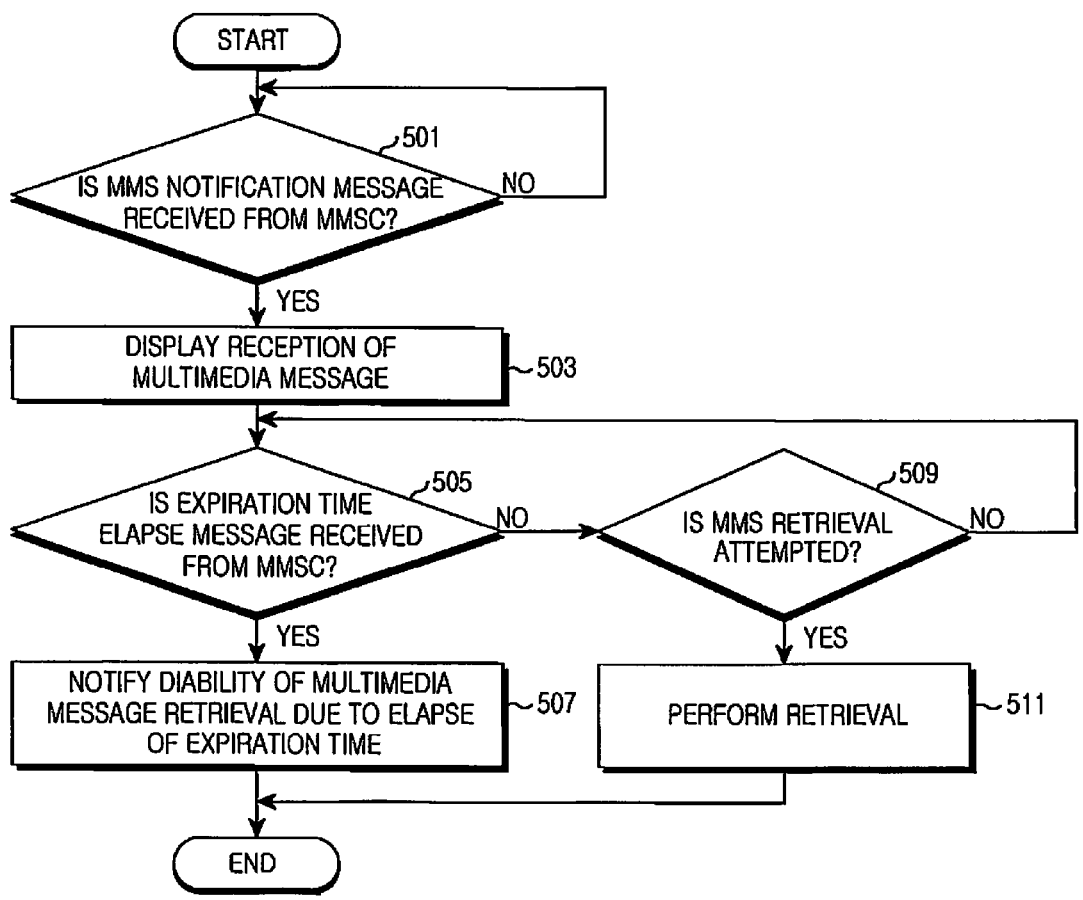
FIG. 5 is a flowchart illustrating a process of preventing multimedia message retrieval in a mobile communication terminal according to the present invention.

FIG. 5 is a flowchart of a process for preventing a multimedia message retrieval in a communication terminal according to the present invention.

Referring to FIG. 5, in step 501, the mobile communication terminal determines if an MMS notification message indicating that a multimedia message is received from the MMSC. In step 503, when the MMS notification message is received, the mobile communication terminal displays on the display unit 304 a message indicating that the multimedia message has been received.

In step 505, the mobile communication terminal determines if a message indicating that an expiration time of the multimedia message has elapsed is received from the MMSC.

In step 507, when the message indicating that the expiration time of the multimedia message has elapsed is received, the mobile communication terminal disables a retrieval process for the multimedia message, and displays on the display unit 304 a message indicating that the multimedia message retrieval has been disabled due to the lapse of the expiration time.

Then, the mobile communication terminal terminates an algorithm according to the present invention.

In contrast, when the message indicating that the expiration time of the multimedia message has elapsed is not received in step 505, the mobile communication terminal determines if a user tries an MMS retrieval through key manipulation in step 509. When it is determined that the MMS retrieval is not attempted, the mobile communication terminal returns to step 505. In step 511, when it is determined that the MMS retrieval is attempted; the mobile communication terminal performs MMS retrieval for the multimedia message, and terminates an algorithm according to the present invention.

In the above description, when an expiration time of a multimedia message lapses, a retrieval process for a discarded multimedia message is prevented by indicating the lapse of the expiration time. However, the retrieval process of the multimedia message may be prevented also by determining at the reception terminal, the expiration time included in an MMS notification message. However, if the method of preventing the multimedia message retrieval by determining if the expiration time at the reception terminal is employed for a terminal allowing a user to directly change a time such as a GSM terminal, the discarded multimedia message may be undesirably retrieved due to a time difference between a standard time and a time changed by the user. Accordingly, it is preferable for the MMSC to notify the reception terminal of the lapse of the expiration time of the multimedia message.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

As mentioned above, in the present invention, an MMSC of a mobile communication system notifies a mobile terminal that an expiration time of a multimedia message has elapsed, so that an unnecessary connection to a network for the retrieval of a multimedia message discarded in the MMSC can be prevented. Also, an additional cost for the network connection can be prevented.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for preventing multimedia message retrieval in a mobile communication terminal, the method comprising the steps of:
   receiving a notification message indicating arrival of a multimedia message from a multimedia message service center (MMSC);
   determining whether a message indicating lapse of an expiration time of the multimedia message is received from the MMSC before receiving the multimedia message;
   disabling a retrieval process for the multimedia message, when the message indicating the lapse of the expiration time is received; and
   providing a notification of disablement of the retrieval process for the multimedia message.

2. The method of claim 1, wherein the notification of disablement of the retrieval process for the multimedia message is provided on a display unit when the message indicating the lapse of the expiration time is received.

3. A method for preventing multimedia message retrieval in a multimedia message service center (MMSC), the method comprising the steps of:
   receiving a multimedia message from a transmission terminal;
   determining whether an expiration time of the received multimedia message has elapsed before sending the multimedia message to a reception terminal;
   sending to the reception terminal a message indicating the lapse of the expiration of the multimedia message when it is determined that the expiration time of the multimedia message has elapsed; and
   providing a notification of disablement of the retrieval process for the multimedia message.

4. The method of claim 3, further comprising discarding the multimedia message after sending the message indicating the lapse of the expiration time.

5. The method of claim 3, further comprising:
   sending to the reception terminal a notification message indicating arrival of the multimedia message when the multimedia message is received from the transmission terminal;
   determining whether the retrieval of the multimedia message is completed from the reception terminal; and
   determining whether the expiration time of the multimedia message has elapsed when it is determined that the retrieval is not completed.

6. The method of claim 3, further comprising discarding the multimedia message when it is determined that the retrieval of the multimedia message is completed.

7. An apparatus for preventing multimedia message retrieval in a mobile communication terminal comprising:
   a controller configured to disable a retrieval process for the multimedia message when a message indicating a lapse of an expiration time of a multimedia message is received from a multimedia message service center (MMSC) before receiving the multimedia message,
   wherein a notification of disablement of the retrieval process for the multimedia message is provided upon receipt of the message indicating the lapse of the expiration time.

8. The apparatus of claim 7, further comprising a display unit displaying the notification of disablement of the retrieval process of the multimedia message due to the lapse of the expiration time.

9. An apparatus for preventing multimedia message retrieval in a multimedia message service center (MMSC), the apparatus comprising:
   a storage unit configured to store a multimedia message received from a transmission terminal;
   an expiration time determining unit configured to determine whether an expiration time of the multimedia message stored in the storage unit has elapsed before sending the multimedia message to a reception terminal; and a controller configured to send a message indicating lapse of the expiration time to the reception terminal of the multimedia message, wherein a notification of disablement of the retrieval process for the multimedia message is provided upon receipt of the message indicating the lapse of the expiration time.

10. The apparatus of claim 9, wherein the controller discards the multimedia message the expiration time of which has elapsed.

11. A mobile communication terminal for preventing multimedia message retrieval comprising:

a controller configured to disable a retrieval process for the multimedia message when a message indicating a lapse of an expiration time of a multimedia message is received from a multimedia message service center (MMSC) before receiving the multimedia message, wherein a notification of disablement of the retrieval process for the multimedia message is provided upon receipt of the message indicating the lapse of the expiration time.

12. The mobile communication terminal of claim 11, wherein the notification of disablement of the retrieval process for the multimedia message is provided on a display unit when the message indicating the lapse of the expiration time is received.

13. A multimedia message service center (MMSC) for preventing multimedia message retrieval, the MMSC comprising:

a storage unit configured to store a multimedia message received from a transmission terminal;

an expiration time determining unit configured to determine whether an expiration time of the multimedia message stored in the storage unit has elapsed before sending the multimedia message to a reception terminal; and a controller configured to send a message indicating lapse of the expiration time to the reception terminal of the multimedia message, wherein a notification of disablement of the retrieval process for the multimedia message is provided upon receipt of the message indicating the lapse of the expiration time.

14. The multimedia message service center of claim 13, wherein the controller discards the multimedia message the expiration time of which has elapsed.

15. A non-transitory computer-readable recording medium having recorded thereon a program for preventing multimedia message retrieval in a mobile communication terminal, the computer-readable recording medium comprising:

a first code segment for receiving a notification message indicating arrival of a multimedia message from a multimedia message service center (MMSC);

a second code segment, for determining by an expiration time determining unit configured to determine whether a message indicating lapse of an expiration time of the multimedia message is received from the MMSC before receiving the multimedia message; and a third code segment for disabling a retrieval process for the multimedia message when the message indicating the lapse of the expiration time is received, wherein a notification of disablement of the retrieval process for the multimedia message is provided upon receipt of the message indicating the lapse of the expiration time.

16. A non-transitory computer-readable recording medium having recorded thereon a program for preventing multimedia message retrieval in a multimedia message service center (MMSC), the computer-readable recording medium comprising:

a first code segment for determining by an expiration time determining unit configured to determine whether an expiration time of a received multimedia message has elapsed before sending the received multimedia message to a reception terminal when the multimedia message is received from a transmission terminal; and a second code segment for sending to the reception terminal a message indicating lapse of the expiration of the multimedia message when it is determined that the expiration time of the received multimedia message has elapsed, wherein a notification of disablement of the retrieval process for the multimedia message is provided upon receipt of the message indicating the lapse of the expiration time.

* * * * *